US008098212B2

(12) United States Patent (10) Patent No.: US 8,098,212 B2
Jin et al. (45) Date of Patent: Jan. 17, 2012

(54) METHOD FOR ANTENNA ARRAY PARTITIONING

(75) Inventors: Hang Jin, Plano, TX (US); Ahmadreza Hedayat, Allen, TX (US)

(73) Assignee: Cisco Technology, Inc., San Jose, CA (US)

(*) Notice: Subject to any disclaimer, the term of this patent is extended or adjusted under 35 U.S.C. 154(b) by 1019 days.

(21) Appl. No.: 11/776,875

(22) Filed: Jul. 12, 2007

(65) Prior Publication Data

US 2008/0136735 A1 Jun. 12, 2008

Related U.S. Application Data

(60) Provisional application No. 60/837,981, filed on Aug. 15, 2006.

(51) Int. Cl.
 *H01Q 21/00* (2006.01)
(52) U.S. Cl. ............... 343/893; 370/334; 455/130
(58) Field of Classification Search .......... 375/267, 375/260, 295, 347, 299, 346; 455/562.1, 455/101, 561, 103, 129, 575.1; 342/377, 342/367; 343/754, 702, 701
See application file for complete search history.

(56) References Cited

U.S. PATENT DOCUMENTS

| 7,200,368 | B1 * | 4/2007 | Hottinen et al. | 455/101 |
|---|---|---|---|---|
| 7,403,748 | B1 * | 7/2008 | Keskitalo et al. | 455/101 |
| 7,787,553 | B2 * | 8/2010 | Prasad et al. | 375/267 |
| 2002/0102950 | A1 * | 8/2002 | Gore et al. | 455/101 |
| 2002/0154705 | A1 | 10/2002 | Walton et al. | |
| 2004/0082303 | A1 * | 4/2004 | Giannakis et al. | 455/130 |
| 2005/0093744 | A1 * | 5/2005 | Davis et al. | 342/368 |
| 2005/0276317 | A1 * | 12/2005 | Jeong et al. | 375/213 |
| 2006/0039273 | A1 * | 2/2006 | Gore et al. | 370/208 |
| 2006/0146760 | A1 | 7/2006 | Khandekar et al. | |
| 2006/0203792 | A1 * | 9/2006 | Kogiantis et al. | 370/343 |
| 2007/0105508 | A1 * | 5/2007 | Tong et al. | 455/101 |
| 2007/0184849 | A1 * | 8/2007 | Zheng | 455/456.1 |
| 2008/0108310 | A1 * | 5/2008 | Tong et al. | 455/69 |
| 2010/0067512 | A1 * | 3/2010 | Nam et al. | 370/342 |

OTHER PUBLICATIONS

PCT International Search Report and Written Opinion of the International Searching Authority, Mar. 3, 2008.

* cited by examiner

*Primary Examiner* — Nick Corsaro
*Assistant Examiner* — Mahendra Patel

(57) ABSTRACT

A method for partitioning a plurality of antennas in a wireless communication system, in which the antennas are grouped into a first set of partitions and a second set of partitions. One or more signal transmission schemes are performed with the antennas grouped into the first set of partitions for a first time period, and then with the antennas grouped into the second set of partitions for a second time period.

14 Claims, 3 Drawing Sheets

METHOD FOR ANTENNA ARRAY PARTITIONING

CROSS REFERENCE

The present application claims the benefits of U.S. Provisional Patent Application Ser. No. 60/837,981, which was filed on Aug. 15, 2006.

BACKGROUND

The present invention relates generally to wireless communications, and more particularly to a method for partitioning antenna array in a wireless communication system.

It has become increasingly common for wireless communication systems to equip with a plurality of antennas in order to improve signal coverage and increase system reliability. Beam forming (BF) is one of the transmission schemes that are broadly used, due to its reliability against signal fading. BF is a technique used with arrays of transmitters or receivers that controls a radiation pattern. When receiving a signal, BF can increase the gain in the direction of wanted signals and decrease the gain in the direction of interference and noise. When transmitting a signal, a beamformer controls the amplitude and phase of the signal at each transmitter, in order to create a constructive pattern in a desired direction. As such, information from different sensors can be combined in a way that an expected pattern of radiation can be observed.

Recently, space-time coding (STC) has attracted many attentions in the wireless communication industry. STC relies on transmitting multiple, redundant copies of a data stream to the receiver in order to increase their change of surviving a physical path between transmission and reception, and still remain in a good enough state for reliable decoding. Similar to BF, STC improves reliability against short-term fading.

Depending on various wireless network parameters, it is sometimes advantageous to employ BF and STC simultaneously in an antenna array. This usually requires partitioning the antenna array, where each partition represents a virtual antenna, such that STC can be implemented among various virtual antennas and BF can be performed by each virtual antenna.

FIG. 1 illustrates a conventional antenna partitioning schemes in a wireless communication system, in which both BF and STC are used. At the signal transmitting end, antennas N1, N2 . . . N9 are shown in an array. At the signal receiving end, a wireless node, such as a base station, M1 receives signals from these multiple antennas N1, N2 . . . N9. In this example, antennas N1, N2 and N3 are grouped together in a partition, which is also referred to as a virtual antenna. Likewise, antennas N4, N5 and N6 are grouped together in a separate partition, and antennas N7, N8 and N9 are grouped together in another separate partition. BF and STC are performed using these virtual antennas.

In order to improve the performance of an antenna array implemented with both BF and STC schemes, spatial correlations among these virtual antennas should be low. Besides physical deployments of the antennas, the spatial correlations depend on various factors, mainly the signal propagation environment. Thus, before partitioning an antenna array, its spatial correlations must be obtained through some training, or blind approaches.

Conventionally, it is usually difficult to provide a partitioning scheme, which offers good performance throughout a long time span. This is due to the fact that statistical properties of a wireless channel between an antenna array and a wireless node can change in a way that a partitioning scheme is favorable in a given time and unfavorable in another. For example, with reference to FIG. 2, the properties of a wireless channel between a virtual antenna consisted of antennas N7, N8 and N9 and the wireless node M1 are altered by a bus 200 moving in between them. The bus 200 obstructs signal transmission between the virtual antenna and the wireless node M1, thereby degrading the performance of the partition of antennas N7, N8 and N9.

As such, what is needed is a method for partitioning a plurality of antennas in a wireless communication system using both BC and STC in a way that mitigates the impact a change of channel conditions makes on signal transmission.

SUMMARY

The present invention discloses a method for partitioning a plurality of antennas in a wireless communication system. In one exemplar method, the antennas are grouped into a first set of partitions and a second set of partitions. One or more signal transmission schemes are performed with the antennas grouped into the first set of partitions for a first time period, and then with the antennas grouped into the second set of partitions for a second time period.

The construction and method of operation of the invention, however, together with additional objectives and advantages thereof will be best understood from the following description of specific embodiments when read in connection with the accompanying drawings.

DESCRIPTION

This invention describes a method for partitioning an antenna array in a wireless communication system. The following merely illustrates various embodiments of the present invention for purposes of explaining the principles thereof. It is understood that those skilled in the art will be able to devise various equivalents that, even though not explicitly described herein, embody the principles of this invention.

Figure 1:
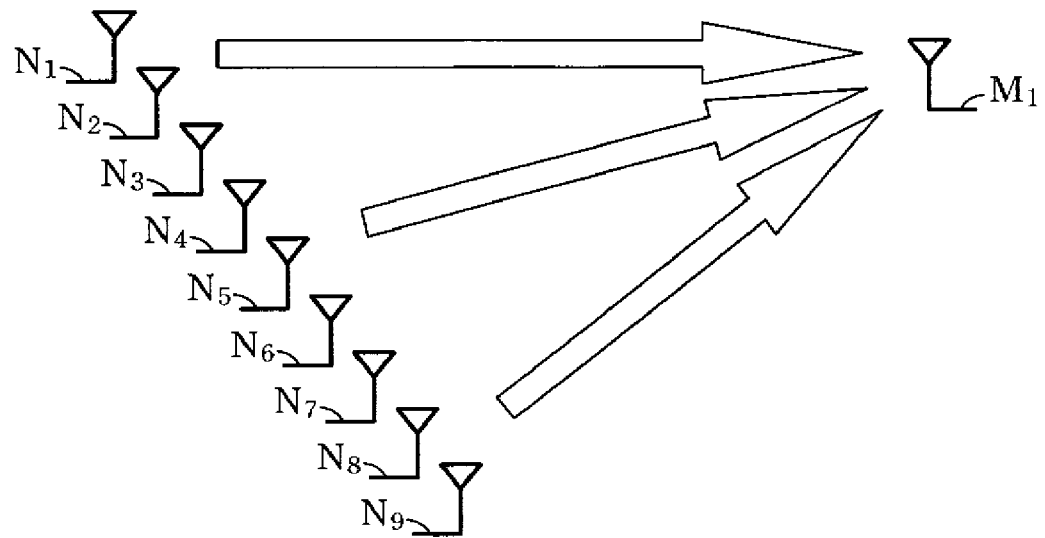
FIG. 1 illustrates a conventional wireless communication system where antennas at the signal transmitting end are partitioned into various virtual antennas.
Figure 2:
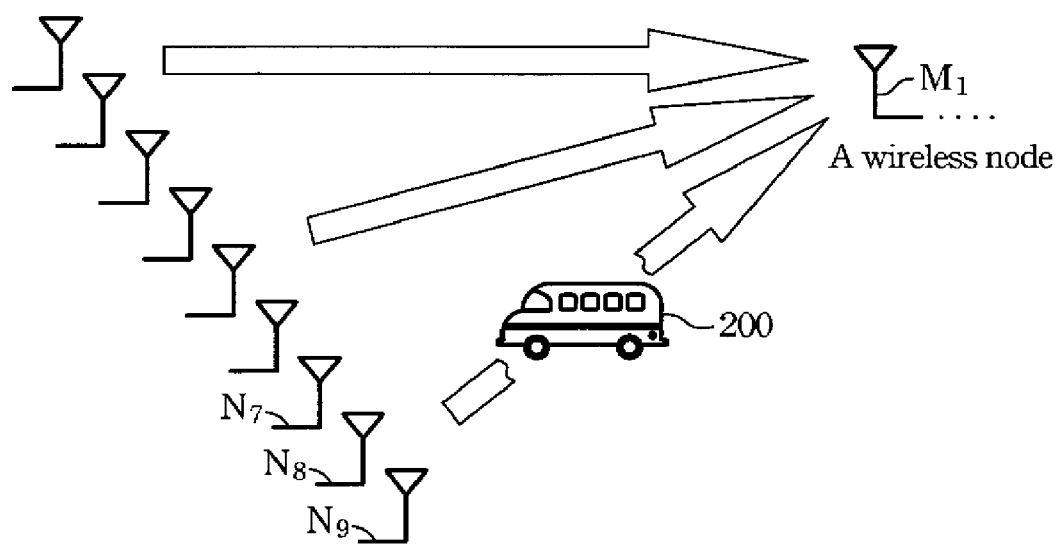
FIG. 2 illustrates a conventional wireless communication system where conditions of a channel between a virtual antenna and a wireless node are altered.
Figure 3A:
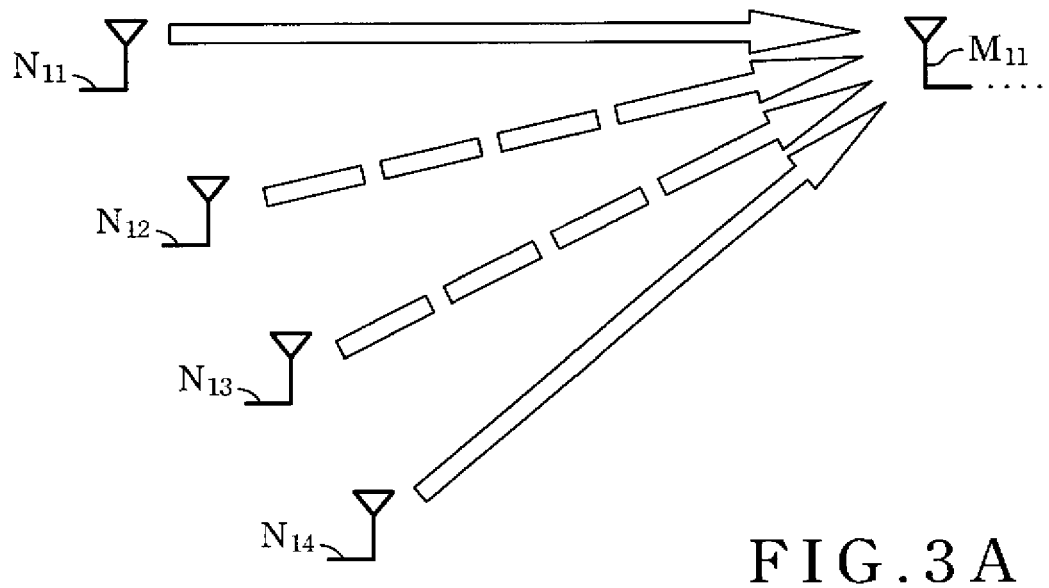
FIGS. 3A and 3B illustrate a wireless communication system where antennas at the signal transmitting end are partitioned into various virtual antennas in accordance with one embodiment of the present invention.
Figure 3B:
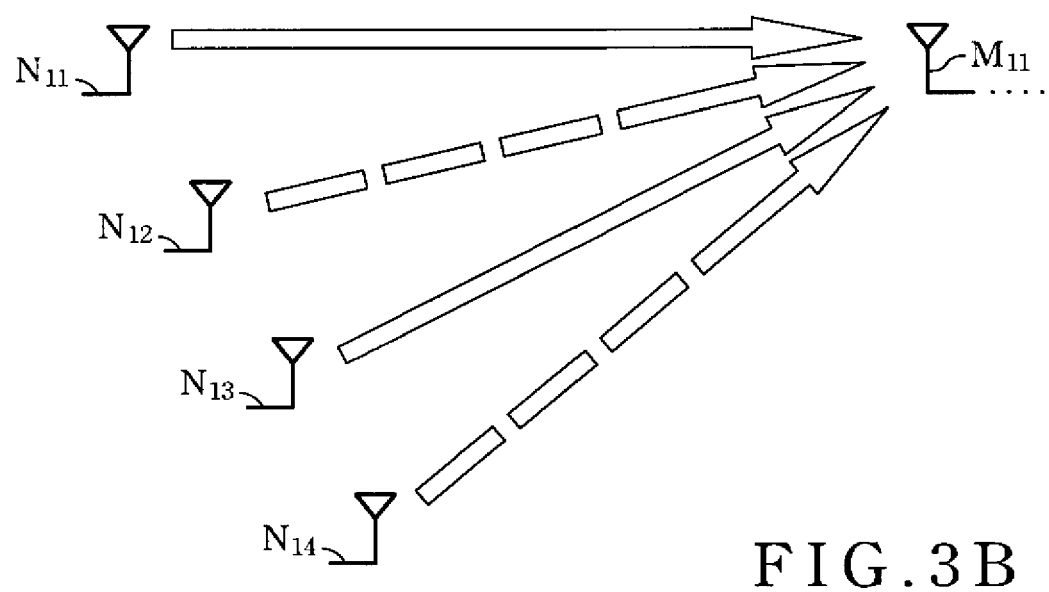

FIG. 3 illustrates an antenna partitioning scheme in a wireless communication system where both BF and STC are used in accordance with one embodiment of the present invention. At the signal transmitting end, antennas N11, N12, N13 and N14 are shown in an array. At the signal receiving end, a wireless node, such as a base station, M11 receives signals from these multiple antennas N11, N12, N13 and N14. These antennas are randomly or pseudo-randomly grouped into various antenna partitions, which as mentioned above are also referred to as virtual antennas for purposes of performing BF and STC schemes. In this exemplary embodiment, antennas N11 and N14 are grouped into a partition, and antennas N12 and N13 are grouped into another partition. These partitions are collectively referred to as the first set of antenna partitions.

The antennas N11, N12, N13 and N14 can be grouped into more than one set of antenna partitions. For example, antennas N11 and N13 can also be grouped into a partition, and antennas N12 and N14 into another. These partitions are collectively referred to as the second set of antenna partitions. In this embodiment, BF and STC schemes are performed based on the first set of antenna partitions for a first predetermined time period. Upon expiration of the first time period, the wireless communication system switches to use the second set of antenna partitions for a second predetermined time period. This process is repeated by hopping between the two sets of antenna partitions. Thus, when a change of conditions of a wireless channel causes a virtual antenna to function ineffectively or inefficiently, the antenna partition hopping can provide the virtual antenna with various combinations of physical antennas over a long period time, thereby avoiding a permanent failure of this particular virtual antenna.

It is noted that the numbers of antennas for two partitions do not have to be the same. Neither do the antennas within one partition needs to be physically adjacent to one another, event though their spatial correlations should be low. It is also noted that hardware implications of this portion hopping scheme is negligible since both STC and BF are fully implemented in the digital signal processing (DSP) level.

Figure 4:
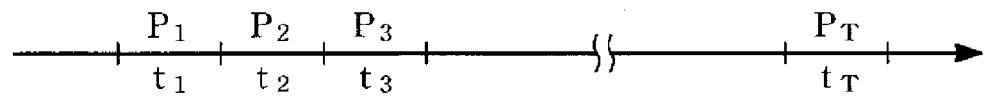
FIG. 4 shows a mapping of various virtual antennas to multiple time periods in accordance with one embodiment of the present invention.

The above mentioned partition hopping scheme can be expanded to a wireless communication system having N antennas at the signal transmitting end. Assuming that STC utilizes a two-antenna orthogonal black, it would suffice to partition the antenna array into two partitions, each with one half of physical antennas, i.e., N/2. T sets of antenna partitions $\{P_1, P_2 \ldots P_t\}$ are selected randomly or pseudo-randomly for T time periods $\{t_1, t_2 \ldots t_T\}$, during each of which its corresponding set of antenna partitions is used for performing BF and STC. For example, as shown in FIG. 4, a wireless communication system initially selects a first set of antenna partitions $P_1$ to perform BF and STC for a first time period $t_1$. Upon expiration of the first time period $t_1$, the system switches from the first set of antenna partitions $P_1$ to a second set of antenna partitions $P_2$ for a second time period $t_2$. This partition hopping process will be continued until the time period $t_T$ ends. In the case where the partition hopping is to be performed continuously, the number of time periods T can be set to be infinite.

It is noted that the sequence $\{P_1, P_2 \ldots P_t\}$ may be different from one wireless node to another. It is noted that although, in the above example, the antenna partitions are selected randomly or pseudo-randomly, they can also be selected according to a predetermined pattern or order. For example in a wireless communication system where N physical antennas are to be grouped into two partitions, one partition can be made from the odd number antennas and the other partition can be made from the even number antennas.

Figure 5:
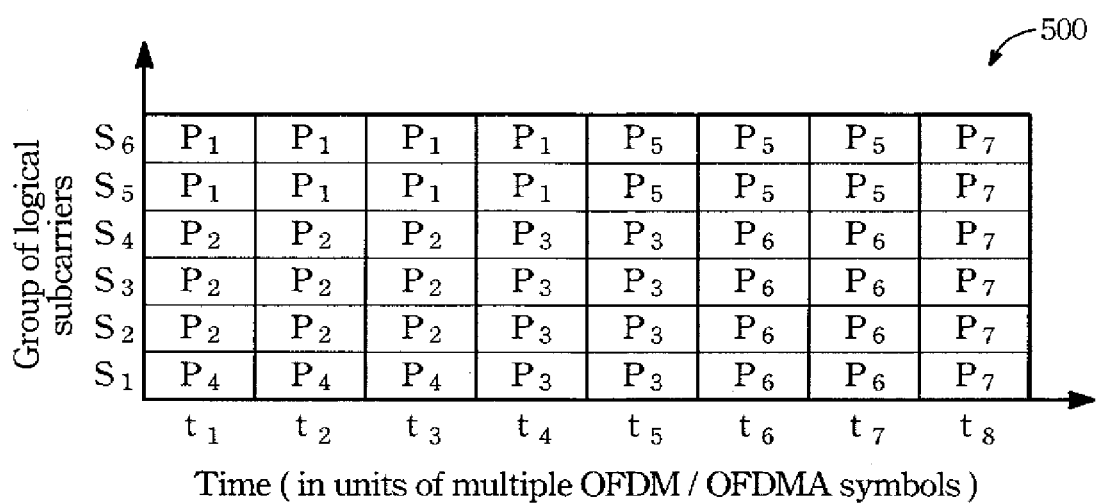
FIG. 5 shows a mapping of various virtual antennas to multiple frequency-time slots in accordance with one embodiment of the present invention.

The proposed partition hopping scheme can be applied in a wireless communication system that uses orthogonal frequency-division multiplexing (OFDM) or orthogonal frequency division multiple access (OFDMA) technology. FIG. 5 shows a graph 500 mapping various sets of antenna partitions to multiple frequency-time slots in accordance with one embodiment of the present invention. In this exemplar embodiment, the antennas of the system are grouped into seven sets of antenna partitions $P_1, P_2 \ldots P_7$. The x-axis of the graph 500 represents time domain in units of multiple OFDM/OFDMA symbols, and the y-axis represents frequency domain represented by subcarriers of various frequency ranges. In OFDM/OFDMA technology, a channel is divided into a plurality of slots, each of which is defined by a time period multiplied by a subcarrier. For example, in the slot defined by time period $t_1$ multiplied by subcarrier $s_1$, the set of antenna partitions $P_4$ is used for performing BF and STC, and in the slot defined by time period $t_2$ multiplied by subcarrier $s_2$, the set of antenna partitions $P_2$ is used.

The above mentioned partitioning scheme can be expanded to a wireless communication system having N antennas at the signal transmitting end. In a wireless communication system using OFDM/OFDMA technology, a channel can be divided into slots defined by time periods $\{t_1, t_2 \ldots t_T\}$ multiplied by subcarriers $\{\pi_1, \pi_2 \ldots \pi_F\}$ where T is the number of time slots and F is the number of subcarriers. The multiple sets of antenna partitions are defined as a T×F matrix, $\{[P_{1,1} \ldots P_{1,F}] \ldots [P_{T,1} \ldots P_{T,F}]\}$.

One advantage of the proposed antenna partition hopping scheme is to reduce the impact caused by a change of signal propagation environment on a wireless communication system, without having to acquire statistical knowledge of wireless channels. Since the conditions of wireless channels change overtime, conventional fixed partition schemes may not be proper, and therefore may cause degradation of system performance. Furthermore, the proposed antenna partition hopping scheme allows a wireless communication system to be built in a cost-efficient way, since acquiring statistical knowledge of a wireless channel in order to compensate a change of channel conditions often requires additional complex hardware or software implementations.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed is:

1. A method comprising:
   in a wireless communication system, grouping two or more antennas from a plurality of antennas at a wireless device into a first set of partitions;
   grouping two or more antennas from the plurality of antennas into a second set of partitions;
   assigning a first set of subcarriers to the first set of partitions according a transmission scheme that subdivides the transmit frequency band into subcarriers;
   assigning a second set of subcarriers to the second set of partitions according the transmission scheme;
   wherein the first and second sets of subcarriers are assigned according to orthogonal frequency-division multiplexing (OFDM) or orthogonal frequency division multiple access (OFDMA) techniques;
   performing beamforming using the first set of subcarriers and space-time coding to transmit wireless signals via the antennas grouped into the first set of partitions for a first time period;
   performing beamforming using the second set of subcarriers and space-time coding to transmit wireless signals via the antennas grouped into the second set of partitions for a second time period; and setting the first time period and the second time period to correspond to a multiple of a duration of a symbol transmission time period of the wireless signals, wherein the first and second time periods have different durations; and wherein grouping the two or more antennas into the first set of partitions and into the second set of partitions is repeated so as to hop between the first and second sets of partitions of antennas during subsequent time periods for transmitting wireless signals.

2. The method of claim 1, wherein the first and second sets of partitions are selected pseudo-randomly.

3. The method of claim 1, wherein the first and second sets of partitions are selected without regard to changes over time of wireless channels in the wireless communication system.

4. The method of claim 1, wherein the first and second sets of partitions have different numbers of antennas.

5. The method of claim 1, wherein the first and second time periods have different durations.

6. A method comprising:
in a wireless communication system, grouping two or more antennas from a plurality of antennas at a wireless device into a first set of partitions;
grouping two or more antennas from the plurality of antennas into a second set of partitions;
assigning a first set of subcarriers to the first set of partitions according a transmission scheme that subdivides the transmit frequency band into subcarriers;
assigning a second set of subcarriers to the second set of partitions according the transmission scheme;
wherein the first and second sets of subcarriers are assigned according to orthogonal frequency-division multiplexing (OFDM) or orthogonal frequency division multiple access (OFDMA) techniques;
performing beamforming using the first set of subcarriers and space-time coding to transmit wireless signals via the antennas grouped into the first set of partitions in a first slot of channel resources defined by a first time period and the first set of subcarriers in a first frequency range;
performing beamforming using the first set of subcarriers and space-time coding to transmit wireless signals via the antennas grouped into the second set of partitions in a second slot of channel resources defined by a second time period and the second set of subcarriers in a second frequency range, wherein the second time period follows the first time period; and
setting the first time period and the second time period to correspond to a multiple of a duration of a symbol transmission time period of the wireless signals, wherein the first and second time periods have different durations; and
wherein grouping the two or more antennas into the first set of partitions and into the second set of partitions is repeated so as to hop between the first and second sets of partitions of antennas during subsequent time periods for transmitting wireless signals.

7. The method of claim 6, wherein the first and second sets of partitions are selected pseudo-randomly.

8. The method of claim 6, wherein the first and second sets of partitions are selected without regard to changes over time of wireless channels in the wireless communication system.

9. The method of claim 6, wherein the first and second sets of partitions have different numbers of antennas.

10. The method of claim 6, wherein the first and second frequency ranges have different bandwidths.

11. A system comprising:
a plurality of antennas at a wireless device in a wireless communications system, two or more of which are grouped into at least a first set of partitions and a second set of partitions; and
a wireless node configured to receive wireless signals from the antennas;
wherein the wireless device is configured to transmit the wireless signals using a combination of beamforming and space-time code techniques via virtual antennas defined by the first set of partitions for a first time period and by the second set of partitions for a second time period, the first time period and the second time period being set to correspond to a multiple of a duration of a symbol transmission time period of the wireless signals, wherein the first and second time periods have different durations; and
wherein the wireless device is configured to assign, according to orthogonal frequency-division multiplexing (OFDM) or orthogonal frequency division multiple access (OFDMA) techniques, a first set of subcarriers for use in transmitting the wireless signals via the first set of partitions for a duration of the first time period and a second set of subcarriers for use in transmitting the wireless signals via the second set of partitions for a duration of the second time period;
wherein the wireless device is further configured to repeat the grouping of the two or more antennas into the first set of partitions and into the second set of partitions so as to hop between the first and second sets of partitions of antennas during subsequent time periods for transmitting wireless signals.

12. The wireless communication system of claim 11, wherein the first and second sets of partitions are selected pseudo-randomly.

13. The wireless communication system of claim 11, wherein the first and second sets of partitions are selected without regard to changes over time of wireless channels in the wireless communication system.

14. The wireless communication system of claim 11, wherein the first and second sets of partitions have different numbers of antennas.

* * * * *